(12) United States Patent
Ezrielev et al.

(10) Patent No.: US 12,526,152 B2
(45) Date of Patent: Jan. 13, 2026

(54) REVERSING SYMMETRIC ENCRYPTIONS USING KEYS FOUND IN SNAPSHOTS—PER-FILE KEYS, HASHES OF HASHES

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 342 days.

(21) Appl. No.: 18/299,373

(22) Filed: Apr. 12, 2023

(65) Prior Publication Data
US 2024/0348451 A1    Oct. 17, 2024

(51) Int. Cl.
*H04L 9/32* (2006.01)
*H04L 9/08* (2006.01)

(52) U.S. Cl.
CPC .......... *H04L 9/3242* (2013.01); *H04L 9/0861* (2013.01)

(58) Field of Classification Search
CPC ............... H04L 9/3242; H04L 9/0861; G06F 21/566; G06F 21/568; G06F 21/56
See application file for complete search history.

(56) References Cited

U.S. PATENT DOCUMENTS

| | | | |
|---|---|---|---|
| 9,594,906 B1* | 3/2017 | Langton | G06F 21/564 |
| 10,229,269 B1* | 3/2019 | Patton | G06F 21/554 |
| 2018/0114020 A1* | 4/2018 | Hirschberg | G06F 21/566 |
| 2019/0018961 A1* | 1/2019 | Kostyushko | H04L 9/002 |
| 2020/0042707 A1* | 2/2020 | Kucherov | G06F 3/0683 |
| 2021/0049031 A1* | 2/2021 | Halcrow | G06F 21/566 |
| 2022/0292194 A1* | 9/2022 | Edwards | G06F 9/485 |

OTHER PUBLICATIONS

Bajpai. P. et al., "Memory Forensics Against Ransomware," IEEE, 2020, 8 pages.
Wikipedia, Salt (Cryptography), https://en.wikipedia.org/wiki/Salt_(cryptography), Jan. 30, 2023.

* cited by examiner

*Primary Examiner* — Mohammed Waliullah
(74) *Attorney, Agent, or Firm* — Workman Nydegger

(57) ABSTRACT

One example method includes taking snapshots of a ransomware process, obtaining, from the snapshots, a key sequence that comprises a subset of keys used by the ransomware process to encrypt data, hashing one of the keys of the subset of keys to generate a hash, and when the hash matches one of the keys in the subset of keys, using the hash to deduce other keys used by the ransomware process and not already included in the subset of keys.

18 Claims, 3 Drawing Sheets

REVERSING SYMMETRIC ENCRYPTIONS USING KEYS FOUND IN SNAPSHOTS—PER-FILE KEYS, HASHES OF HASHES

FIELD OF THE INVENTION

Embodiments of the present invention generally relate to ransomware detection and remediation. More particularly, at least some embodiments of the invention relate to systems, hardware, software, computer-readable media, and methods, for reversing symmetric encryptions of data such as may be implemented by ransomware.

BACKGROUND

Many ransomware processes include an encryption component that operates to encrypt target data. The encryption of the data prevents the data owner from using the data until a ransom is paid to the attacker, who may then provide the data owner with a key to decrypt the data. Thus, without the key, the data is unusable by the data owner, and the business and other operations of the owner may be significantly compromised.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
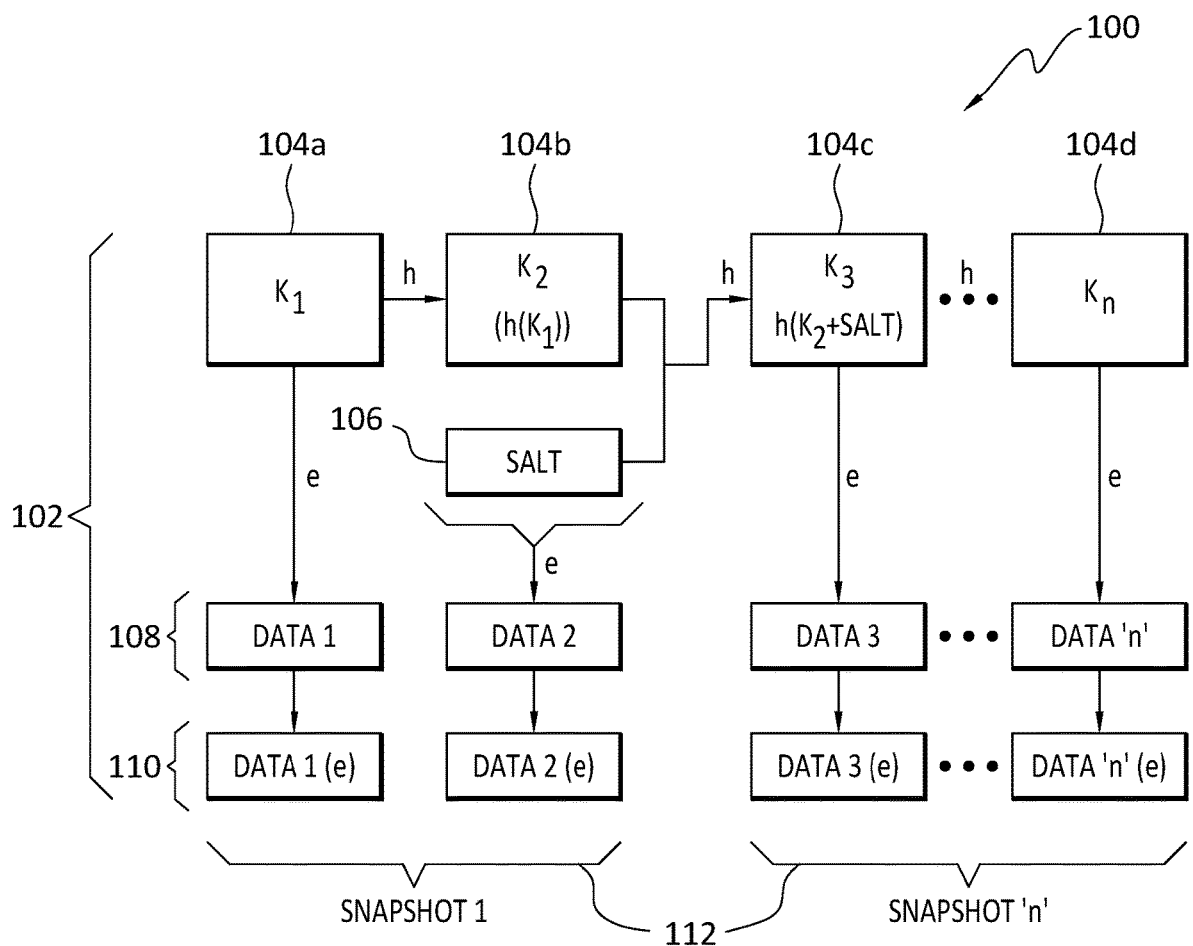
FIG. 1 discloses aspects of an example architecture and operating environment according to an embodiment.

Embodiments of the present invention generally relate to ransomware detection and remediation. More particularly, at least some embodiments of the invention relate to systems, hardware, software, computer-readable media, and methods, for reversing symmetric encryptions of data such as may be implemented by ransomware.

In one embodiment, a group of one or more snapshots may be taken of a data encryption process, such as may be performed by a ransomware process. The data encryption process may be a symmetric encryption process in which the same key may be used to both encrypt data, and then decrypt the encrypted data. The information in the snapshots, which may comprise unencrypted data, encrypted data, encryption keys, salts, and hashes, may then be used to identify which elements are changing from one snapshot to another. Because some ransomware processes generate an encryption key by hashing a previous encryption key, the comparison of the snapshots may reveal that the encryption keys are changing. With this information, an embodiment may then be able to identify and obtain a sequence of keys. The keys may then be hashed, with and/or without a salt component, which may be obtained from one or more snapshots. By comparing the hashes of the keys with the keys obtained from the snapshots, which are themselves hashes of keys, the key(s) used by the snapshotted process may be deduced. Once the keys are determined, the data may then be decrypted. Any suitable hash function may be used, examples of which include, but are not limited to, SHA-1, and MD5.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that the operations of a ransomware process may be leveraged, such as by a data owner, to decrypt, or otherwise make usable, data that has been made unusable by the ransomware process, such as through use of an encryption process. In an embodiment, a process for deducing the keys used by a ransomware process may be relatively lightweight in terms of storage, memory, and processing demands, insofar as the process according to this embodiment may operate using a group of relatively small snapshots of a ransomware process. An embodiment may, through use of a snapshot process, deduce encryption keys of ransomware process without alerting the ransomware process. Various other advantages of one or more embodiments of the invention will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Example Functional/Operational Aspects of an Embodiment

With attention now to FIG. 1, an example functional diagram 100 according to one embodiment is disclosed. As shown, a process 102 may be performed that may comprise a ransomware process that operates to implement symmetric encryption of data. In more detail, the process 102 may generate, in a deterministic way, a series of keys 104a, 104b, 104c, and 104d. As shown, a single key, such as key 104a, may be used as a basis to generate the rest of the keys 104b, 104c, and 104d. To do this, the process 102 may repeatedly hash the keys, starting with the key 104a, to generate additional keys. More specifically, the key 104a may be hashed to generate the key 104b, the key 104b may be hashed to generate the key 104c, and the key 104c hashed to generate the key 104d. Because the process 102 is creating its own keys, there may be no need for an attacker to communicate with the process 102 for the purpose of transmitting keys to the process 102. In this sense at least, the process 102 may be self-sustaining. In some cases, the process 102 may use one or more salts to create a key. For example, the key 104c is created by hashing the key 104b together with a salt 106. Further information concerning the use of salts in hash operations such as those just described may be found at: https://en.wikipedia.org/wiki/Salt_(cryptography).

With continued reference to FIG. 1, the process 102 may then use the various keys 104a, 104b, 104c, and 104d that have been created to encrypt respective data 108, to thereby create encrypted data 110. Due to the use of multiple different keys, which may be employed on a per-file basis for example, that is, a respective unique key for each file, it may be difficult for the data owner to recover the data 108 after it has been encrypted by the process 102.

Thus, an embodiment may take a number of snapshots 112 of the process 102 while the process is running. In an embodiment, the snapshots 112 may comprise small, or 'zoomed in,' snapshots since the snapshots 112 may be taken, for example, at a relatively high frequency within a defined timeframe. These zoomed in snapshots, which may comprise information about running processes, such as the key generation and data encryption processes of the process 102, may be randomly sampled, and those sampled zoomed in snapshots may be examined to obtain a sequence of keys, such as the keys 104a, 104b, 104c, and 104d, for example, as discussed in more detail below.

Figure 2:
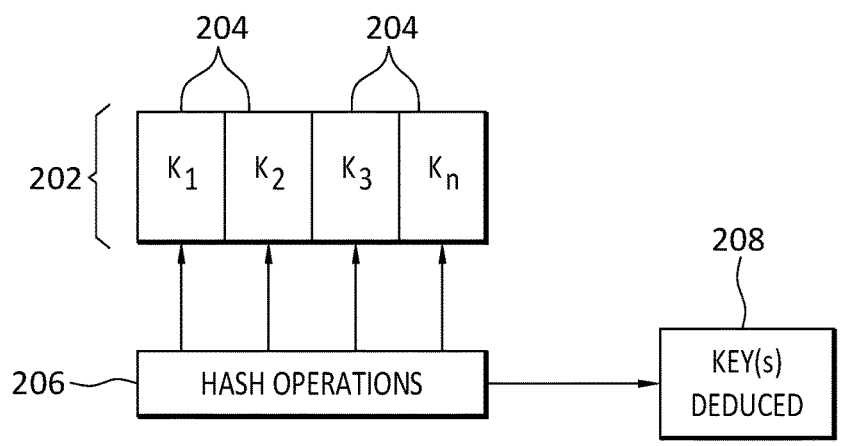
FIG. 2 discloses aspects of the functions and operation of an embodiment.

With reference now to FIG. 2, and continued reference to FIG. 1, the snapshots 112 may be taken according to a particular cadence, and/or according to a cadence of the process 102. One example 'cadence' may be expressed as taking one snapshot per unit time, that is, the cadence or 'beat' is such that a specified amount of time may pass between consecutive snapshots 112. In general, taking snapshots 112 according to a particular cadence may result in the creation of a snapshot stream which represents multiple points of time over which the operations of the process 102 are being performed taken.

By taking a number 'n' of snapshots 112 at a particular cadence, and then comparing one or more of those snapshots 112 to one or more of the other snapshots 112, an embodiment may be able to determine what changes are occurring from one snapshot 112 to another. For example, and with reference to the example of FIG. 1, a comparison of snapshot (1) 112 to snapshot ('n') 112 shows that an operation, such as a hash operation for example, performed on the key 104b has resulted in the generation of a new key 104c. As further indicated in FIG. 1, a snapshot (1) 112 may also capture other information, such as the salt 106 that was used to generate the key 104c.

Note that it may not be necessary to snapshot the entire process 102, but only a portion of the process 102. Thus, the snapshots 112 may collectively include some, but not all, keys and salts used by the process 102. Using the first identified key, an embodiment may then hash that key again and again and then decrypt files to see which files were encrypted with which key. Data that was decrypted with the wrong key, that is, the wrong key obtained using the aforementioned process according to one embodiment, will return garbage data and, in this way, an embodiment may thus identify the correct key. Note that the respective last writing times, that is, the times when the most recent write occurred, of the encrypted files, will indicate the order in which the files were encrypted, and the chronological sequence of keys may thus be obtained. The keys may then be readily matched to the respective files that they were used to encrypt, and the keys then used to decrypt the files.

In general, and with continued reference to example snapshot processes according to one or more embodiments, the number of snapshots 112 taken may be such as to provide enough information, such as a salt and two or more keys for example, to enable deduction of the keys. In an embodiment, snapshots 112 may continue to be taken until a salt is found within one of the snapshots 112. Because each of the keys 104a, 104b, 104c, and 104d is derived from one or more of the other keys, even keys not captured in a snapshot 112 may still be deduced, as discussed below.

As shown in FIG. 2, the snapshots 112, which may be taken in chronological order, may be examined, and a sequence 202 of keys 204 obtained from the examination of the snapshots 112. The keys 204 in the sequence 202 may then be subjected to hash operations 206, such as may be known be typical of ransomware processes. The hash operations 206 may be performed with, and without, any salts 106 found in the snapshots 112. By comparing the hashes generated by the hash operations 206, with one or more of the keys 204 obtained from the snapshots 112, a determination may be made as to how the one or more of the keys 204 were generated, and the remaining keys 204 correspondingly deduced. That is, if a hash generated by the hash operations 206 matches one of the keys 204, then the hash, and salt if applicable, used to generate that key 204 may be inferred. Because each of the keys 204 is generated based on one or more of the other keys, all of the keys 208 used by the process 102 may then be deduced from the key 204 that was determined to match the hash 206. Further, since the data 108 may have been encrypted on a per-file basis, with a unique key for each file, deduction of all the keys may thus enable all of the data to be decrypted.

C. Example Methods

Figure 3:
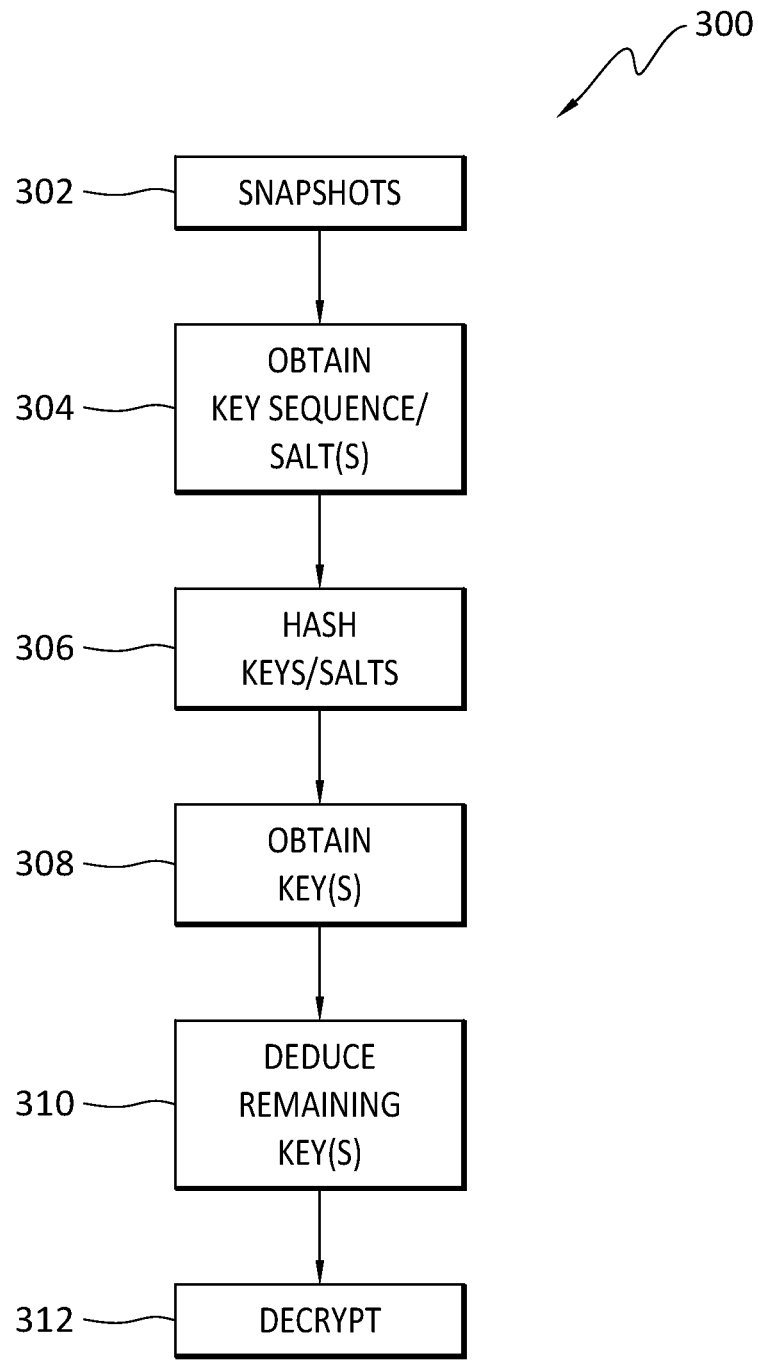
FIG. 3 discloses an example method according to one embodiment.

It is noted with respect to the disclosed methods, including the example method of FIG. 3, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, an example method according to one embodiment is denoted at 300. In an embodiment, the method 300 may be performed in whole, or in part, at a datacenter or in a vault. For example, an embodiment of the method may be directed to a ransomware process running in a datacenter, such as in a backup storage portion of a datacenter. No particular operating site(s) is/are required for any embodiment however.

The example method 300 may begin with the snapshotting 302 of part, or all, of a process known, or suspected, to be a ransomware process. As may be determined by their subsequent examination, the snapshots may comprise, for example, data, keys, salts, and information about the process that is being snapshotted. In an embodiment, the snapshots created at 302 may be stored in a vault or other secure site.

After the snapshots have been generated 302, they may be examined, and a sequence of keys obtained 304 from the snapshots. In more detail, because the snapshots may be taken in a chronological sequence, the snapshots can be compared to determined which element(s) are changing from one snapshot to another. Insofar as the process may be a deterministic key generation process, changes that have occurred to the keys may be determined at 304, and a sequence of the various keys may correspondingly be obtained 304. The snapshots may also be examined for the presence of any salt(s) that the process may have used to generate one or more of the keys. Thus, at 304, a key sequence, as well as one or more salts, may be obtained by examination of the snapshots.

After, a key sequence has been obtained 304, hashing operations, both with and without salts, may be performed 306 on the keys of the key sequence. The hashing operations 306 may be hashing operations known, or suspected, to be used by the process that was initially snapshotted 302. For example, suppose that a key 'C' is known to have been generated by the process by hashing an earlier key 'B.' That information alone may not be enough to be able to determine specifically how key 'C' was obtained. However, and recalling that one key may be a hash of another key, by applying known/suspected hashing operations 306 to key 'B,' it may be determined how key 'C' was obtained. Particularly, if a hashing operation 306 is applied to key 'B' that results in the generation of key 'C' it is then known how key 'C' was generated.

In an embodiment, the hashing operations 306 may simply be applied to one or more keys in the key sequence. Further, in an embodiment, the hashing operations 306 may be applied to a combination of one of those keys and a salt that was discovered in one of the snapshots thus: h(salt+key), where 'h' is the hashing function. Note that a ransomware process may not necessarily use a hash function to generate keys. Thus, embodiments are not limited to the use of hashes but extend more generally to the use of any process that may be used by ransomware to deterministically generate a series of encryption keys.

Once one of the keys is obtained 308 in this way, the remaining keys may be deduced 310 since the process that was used to generate those keys is now known. Because the keys may be deduced 310, there may be no need to snapshot 302 the entire process, which may be impossible or impractical in some circumstances, in order to obtain all the keys used by the process. Further, because the mechanism used by the process to generate the keys may thus be determined, it may be possible to predict the keys that have not yet been generated, but may be, by the process.

Finally, because the keys may have been used by the snapshotted process as part of a symmetric encryption process to encrypt data, the keys that have been deduced may then be used to decrypt 312 the encrypted data. Note that as discussed elsewhere herein, an embodiment may perform a search of the snapshots to determine which keys correspond to which respective encrypted files. Thus, an embodiment may operate to discover a key rehashing pattern from the data and other information in one or more zoom-in snapshots to deduce the remaining encryption keys and then use those keys to decrypt data.

D. Further Example Embodiments

Following are some further example embodiments of the invention. These are presented only by way of example and are not intended to limit the scope of the invention in any way.

Embodiment 1. A method, comprising: taking snapshots of a ransomware process;
    obtaining, from the snapshots, a key sequence that comprises a subset of keys used by the ransomware process to encrypt data; hashing one of the keys of the subset of keys to generate a hash; and when the hash matches one of the keys in the subset of keys, using the hash to deduce other keys used by the ransomware process and not already included in the subset of keys.

Embodiment 2. The method as recited in any preceding embodiment, wherein the hashing comprises hashing a salt together with the one key to generate the hash, and the salt is obtained from one of the snapshots.

Embodiment 3. The method as recited in any preceding embodiment, wherein each of the snapshots corresponds to a respective period of time during which the ransomware process is running.

Embodiment 4. The method as recited in any preceding embodiment, wherein the ransomware process employs a deterministic key generation process in which, as between a first key and a subsequent key, the subsequent key is generated by hashing the first key either together with a salt, or without a salt.

Embodiment 5. The method as recited in any preceding embodiment, wherein encryption of the data by the ransomware process comprises a symmetric encryption process.

Embodiment 6. The method as recited in any preceding embodiment, wherein encryption of the data by the ransomware process comprises application of the keys to the data on a per-file basis.

Embodiment 7. The method as recited in any preceding embodiment, wherein each of the keys in the key sequence comprises a hash of another key.

Embodiment 8. The method as recited in any preceding embodiment, wherein the hashing comprises using a hashing method known, or suspected, to be used by the ransomware process for generating the keys.

Embodiment 9. The method as recited in any preceding embodiment, wherein the keys in the key sequence are arranged, in the key sequence, in an order in which the keys were generated by the ransomware process.

Embodiment 10. The method as recited in any preceding embodiment, wherein the key that matches the hash is an original, or intermediate, key used by the ransomware process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
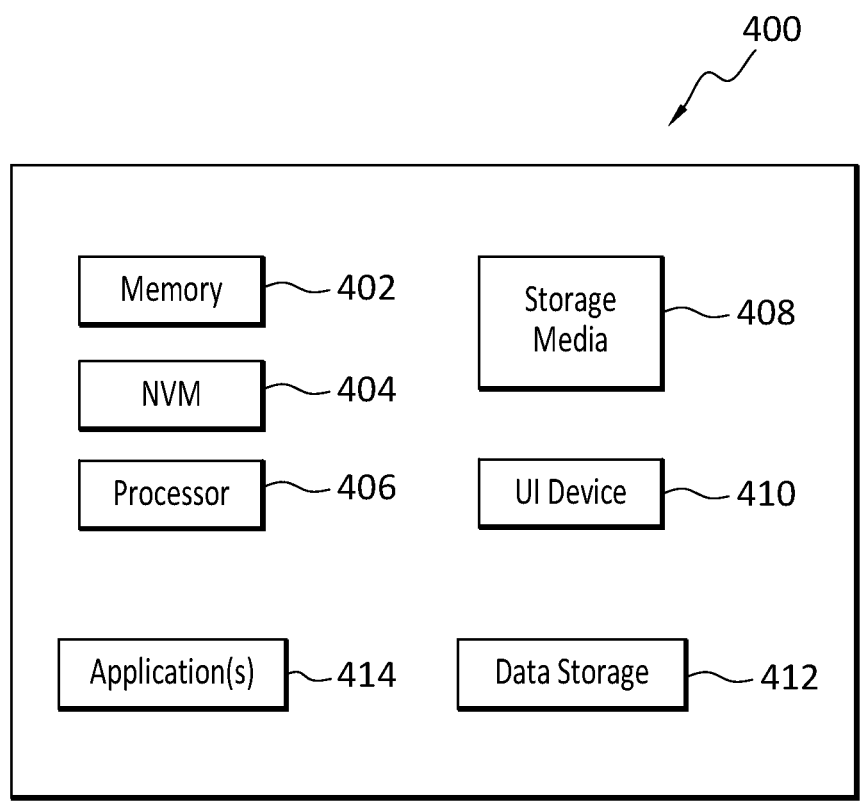
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
taking snapshots of a ransomware process which employs a deterministic key generation process in which, as between a first key and a subsequent key, the subsequent key is generated by hashing the first key either together with a salt, or without a salt;
obtaining, from the snapshots, a key sequence that comprises a subset of keys used by the ransomware process to encrypt data, and the subset includes some, but not all, of the keys used by the ransomware process to encrypt data;
hashing one of the keys of the subset of keys to generate a hash; and
when the hash matches one of the keys in the subset of keys, using the hash to deduce other keys used by the ransomware process but not present in the subset of keys.

2. The method as recited in claim 1, wherein the hashing comprises hashing a salt together with the one key to generate the hash, and the salt is obtained from one of the snapshots.

3. The method as recited in claim 1, wherein each of the snapshots corresponds to a respective period of time during which the ransomware process is running.

4. The method as recited in claim 1, wherein encryption of the data by the ransomware process comprises a symmetric encryption process.

5. The method as recited in claim 1, wherein encryption of the data by the ransomware process comprises application of the keys to the data on a per-file basis.

6. The method as recited in claim 1, wherein each of the keys in the key sequence comprises a hash of another key.

7. The method as recited in claim 1, wherein the hashing comprises using a hashing method known, or suspected, to be used by the ransomware process for generating the keys.

8. The method as recited in claim 1, wherein the keys in the key sequence are arranged, in the key sequence, in an order in which the keys were generated by the ransomware process.

9. The method as recited in claim 1, wherein the key that matches the hash is an original, or intermediate, key used by the ransomware process.

10. A non-transitory storage medium having stored therein instructions that are executable by one or more hardware processors to perform operations comprising:
    taking snapshots of a ransomware process which employs a deterministic key generation process in which, as between a first key and a subsequent key, the subsequent key is generated by hashing the first key either together with a salt, or without a salt;
    obtaining, from the snapshots, a key sequence that comprises a subset of keys used by the ransomware process to encrypt data, and the subset includes some, but not all, of the keys used by the ransomware process to encrypt data;
    hashing one of the keys of the subset of keys to generate a hash; and
    when the hash matches one of the keys in the subset of keys, using the hash to deduce other keys used by the ransomware process but not present in the subset of keys.

11. The non-transitory storage medium as recited in claim 10, wherein the hashing comprises hashing a salt together with the one key to generate the hash, and the salt is obtained from one of the snapshots.

12. The non-transitory storage medium as recited in claim 10, wherein each of the snapshots corresponds to a respective period of time during which the ransomware process is running.

13. The non-transitory storage medium as recited in claim 10, wherein encryption of the data by the ransomware process comprises a symmetric encryption process.

14. The non-transitory storage medium as recited in claim 10, wherein encryption of the data by the ransomware process comprises application of the keys to the data on a per-file basis.

15. The non-transitory storage medium as recited in claim 10, wherein each of the keys in the key sequence comprises a hash of another key.

16. The non-transitory storage medium as recited in claim 10, wherein the hashing comprises using a hashing process known, or suspected, to be used by the ransomware process for generating the keys.

17. The non-transitory storage medium as recited in claim 10, wherein the keys in the key sequence are arranged, in the key sequence, in an order in which the keys were generated by the ransomware process.

18. The non-transitory storage medium as recited in claim 10, wherein the key that matches the hash is an original, or intermediate, key used by the ransomware process.

\* \* \* \* \*